United States Patent
Stewart et al.

(10) Patent No.: US 7,437,458 B1
(45) Date of Patent: Oct. 14, 2008

(54) SYSTEMS AND METHODS FOR PROVIDING QUALITY ASSURANCE

(75) Inventors: Hugh Donal Stewart, Nepean (CA); Gregory Allan Sidebottom, Ottawa (CA); Wladimir de Lara Filho Araujo, Ottawa (CA); Steffen Georg Ries, Ottawa (CA); Scott Joseph Stevens, Windham, NH (US)

(73) Assignee: Juniper Networks, Inc., Sunnyvale, CA (US)

( * ) Notice: Subject to any disclaimer, the term of this patent is extended or adjusted under 35 U.S.C. 154(b) by 1050 days.

(21) Appl. No.: 10/460,158

(22) Filed: Jun. 13, 2003

(51) Int. Cl.
*G06F 15/13* (2006.01)

(52) U.S. Cl. .................. 709/226; 709/203; 709/216; 709/225; 709/231; 370/467; 455/451

(58) Field of Classification Search ............... 709/203, 709/216, 225, 226, 231; 370/467; 455/451
See application file for complete search history.

(56) References Cited

U.S. PATENT DOCUMENTS

| | | | | |
|---|---|---|---|---|
| 6,671,732 B1 * | 12/2003 | Weiner | ............. | 709/231 |
| 6,801,776 B2 * | 10/2004 | Notanii et al. | ............. | 455/451 |
| 7,170,905 B1 * | 1/2007 | Baum et al. | ............. | 370/467 |
| 2003/0093515 A1 * | 5/2003 | Kauffman | ............. | 709/224 |

* cited by examiner

*Primary Examiner*—Jinsong Hu
(74) *Attorney, Agent, or Firm*—Harrity & Harrity, LLP

(57) ABSTRACT

A network includes a media server and a service activation device. The media server may receive a request for content from a subscriber device and transmit a message. The message may identify the subscriber device and include information relating to the content. The service activation device may receive the message from the media server, identify, in response to receiving the message, bandwidth and quality of service requirements for the content, determine whether resources needed to provide the identified bandwidth and quality of service requirements exist, reserve the resources when the resources needed to provide the identified bandwidth and quality of service requirements exist, and transmit a second message to the media server in response to reserving the resources. The second message may cause the media server to provide the content to the subscriber device.

18 Claims, 4 Drawing Sheets

SYSTEMS AND METHODS FOR PROVIDING QUALITY ASSURANCE

FIELD OF THE INVENTION

The present invention relates generally to network communication and, more particularly, to systems and methods for providing quality assurance in providing network content.

BACKGROUND OF THE INVENTION

Networks, such as the Internet, have become an increasingly important part of our everyday lives. Millions of people now access the Internet on a daily basis to shop for goods and services, obtain information of interest (e.g., streaming video and/or audio), and communicate with friends, family, and co-workers (e.g., via e-mail).

Currently, when an individual wishes to purchase a product or simply find information on the Internet, the individual enters into his/her web browser a Uniform Resource Locator (URL) pertaining to a web site of interest in order to access that particular web site. The individual then determines whether the information of interest is available at that particular web site.

For example, suppose an individual wishes to view a live television broadcast via the Internet. The individual accesses the Internet and types in a URL associated with a web site providing the live television broadcast. The individual may then access that web site's home page to begin viewing the live television broadcast.

In some situations, the individual may not have the necessary network resources (e.g., bandwidth) available for viewing the live television broadcast. The lack of adequate resources may cause the live television broadcast to be choppy or fail to play all together, thereby diminishing the individual's viewing experience. The individual's satisfaction may be further diminished when the individual paid for the live television broadcast.

Therefore, there exists a need for systems and methods that improve the providing of multimedia content over a network.

SUMMARY OF THE INVENTION

Systems and methods consistent with the principles of the invention address this and other needs by improving the delivery of multimedia content over a network. In exemplary implementations, a quality assurance module determines whether adequate resources for handling requested content are available prior to providing the content to a subscriber. If adequate resources are available and have been reserved, the quality assurance module authorizes the delivery of the content. If, on the other hand, adequate resources are unavailable, the quality assurance module denies the delivery of the requested content.

In accordance with the principles of the invention, a method for providing content in a network is provided. The method includes receiving a request for content from a subscriber device, identifying network resources for the content, determining whether the identified network resources exist for the request, reserving the identified network resources when the identified network resources exist, and providing the content to the subscriber device in response to reserving the identified network resources.

In another implementation consistent with the principles of the invention, a server includes first logic and second logic. The first logic is configured to receive a first request for content from a subscriber device and forward information relating to the first request. The second logic is configured to receive the information; generate a second request in response to receiving the information, where the second request identifies the subscriber device; transmit the second request to a remote device, where the second request causes the remote device to determine whether adequate resources exist for providing the content to the subscriber device and reserve the resources when adequate resources are determined to exist; receive from the remote device information indicating that adequate resources have been reserved; and forward a message to the first logic in response to receiving the information from the remote device. The first logic provides the content to the subscriber device when adequate resources have been reserved.

In yet another implementation consistent with the principles of the invention, a server includes first logic and second logic. The first logic is configured to receive a message identifying a subscriber device and content requested by the subscriber device. The second logic is configured to determine whether adequate resources exist for providing the requested content to the subscriber device and reserve the resources when adequate resources are determined to exist.

In still another implementation consistent with the principles of the invention, a network includes a media server and a service activation device. The media server may receive a request for content from a subscriber device and transmit a message. The message may identify the subscriber device and include information relating to the content. The service activation device may receive the message from the media server, identify, in response to receiving the message, bandwidth and quality of service requirements for the content, determine whether resources needed to provide the identified bandwidth and quality of service requirements exist, reserve the resources when the resources needed to provide the identified bandwidth and quality of service requirements exist, and transmit a second message to the media server in response to reserving the resources. The second message may cause the media server to provide the content to the subscriber device.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Systems and methods consistent with the principles of the invention improve the delivery of content to subscribers. In an exemplary implementation, a quality assurance module determines whether adequate resources for handling requested content are available prior to providing the content to a subscriber. If adequate resources are available, the quality assurance module may authorize the content request. If, on the other hand, adequate resources are unavailable, the quality assurance module may deny the content request.

Exemplary System

Figure 1:
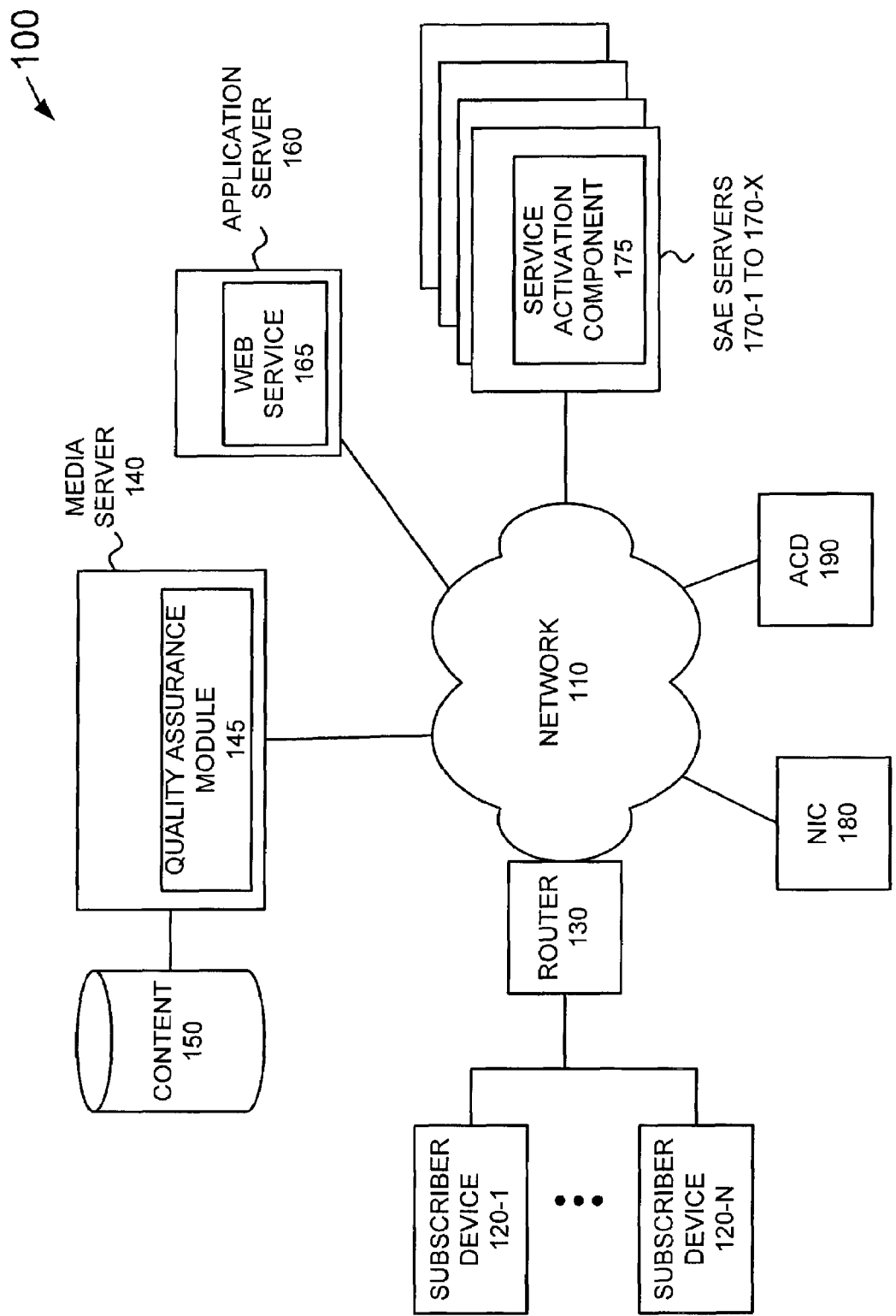
FIG. 1 is a diagram of an exemplary system in which systems and methods consistent with the principles of the invention may be implemented.

FIG. 1 is a diagram of an exemplary system 100 in which systems and methods consistent with the principles of the invention may be implemented. As illustrated, system 100 may include a network 110, a group of subscriber devices 120-1 through 120-N (collectively referred to hereinafter as subscriber devices 120), a router 130, a media server 140, an application server 160, service activation engine (SAE) servers 170-1 through 170-X (collectively referred to hereinafter as SAE servers 170), an optional network information collector (NIC) 180, and an admission control device (ACD) 190. It will be appreciated that the number of devices illustrated in FIG. 1 is provided for simplicity. In practice, a typical system may include more or fewer devices than illustrated in FIG. 1. Moreover, system 100 may include other devices (not shown) that aid in the reception, processing, and/or transmission of data.

Network 110 may include one or more networks of any type, such as a Public Land Mobile Network (PLMN), Public Switched Telephone Network (PSTN), local area network (LAN), metropolitan area network (MAN), wide area network (WAN), the Internet, or an intranet. The PLMN may include packet-switched sub-networks, such as, for example, General Packet Radio Service (GPRS), Cellular Digital Packet Data (CDPD), and Mobile IP sub-networks.

Subscriber devices 120 may include any device capable of transmitting and/or receiving data from network 110. For example, subscriber devices 120 may include a personal computer, a laptop computer, a personal digital assistant (PDA), a television, a telephone device, a video game console, or the like. Subscriber devices 120 may connect to router 130 via any type of connection, such as wired, wireless, and/or optical connections. In one implementation, subscriber devices 120 may connect to router 130 through a service provider's access network (e.g., a cable modem network, a digital subscriber line access multiplexer (DSLAM), etc.).

Router 130 may include a device capable of receiving data from subscriber devices 120 and routing the data to/through network 110. Router 130 may also receive data from network 110 and route the data to the appropriate subscriber device 120. In one implementation, router 130 may include a Juniper Networks™ ERX edge router.

Media server 140 may include a computer device that provides content 150 to subscriber devices 120. In one implementation, media server 140 may include Microsoft's Windows Media® 9 Series or RealNetworks' Helix Server. Media server 140 may include a quality assurance module 145 that allows content providers (i.e., owners of media server 140) to guarantee that their subscribers (e.g., users of subscriber devices 120) receive delivery of requested content at a specific bandwidth and with a specific quality of service (QoS) profile. Quality assurance module 145 may be implemented in hardware, software, or a combination of hardware and software.

Content 150 may be located locally at media server 140 or located remotely from media server 140. Content 150 may include, for example, video-on-demand, live or pre-recorded television or radio broadcasts, streaming music, on-line gaming, or other voice and/or video content. In fact, content 150 may include any content that is stored or dynamically generated in real time on one or multiple network devices. Content 150 may include content that flows through media server 140 and content that does not flow through media server 140. In the latter case, media server 140 may control access to content 150.

Application server 160 may include a computer device that stores and runs web applications that aid in providing content from media server 140 to subscribers associated with subscriber devices 120. In one implementation, application server 160 may include one or more web services 165. Each web service 165 may provide, for example, a Simple Object Access Protocol (SOAP) interface or other type of interface, such as a Common Object Request Broker Architecture (CORBA) interface, and may use a device, such as NIC 180, to locate a particular SAE server 170-1 to 170-X that is currently managing router 130 through which a specified subscriber device 120 is connecting to network 110.

SAE servers 170 may include computer devices that retrieve the appropriate service policies and subscriber profiles from, for example, a lightweight directory access protocol (LDAP) based directory and dynamically configure a router, such as router 130, to deliver a requested service to a subscriber. In one implementation, the service policies may be parameterized. For example, a service may have service policies that provide a subscriber device with Internet Protocol (IP) address X access to a bandwidth of Y bits per second for data flowing from source IP address Z. SAE servers 170 may derive the values for the parameters (e.g., X=10.10.2.3, Y=1.2 Mbps, Z=196.39.75.128) from values provided by media server 140 through web service 165. SAE servers 170 may apply such values to the parameters in the service policies before sending those polices to router 130 for configuring router 130. In addition to the above, SAE servers 170 may also generate service-usage accounting data suitable for billing purposes. It will be appreciated that router 130, quality assurance module 145, and web service 165 may also generate such data.

SAE servers 170 may each include multiple service activation components. One service activation component 175 is illustrated in FIG. 1 for simplicity, however. Service activation component 175 activates a service (e.g., making network resources available to a subscriber device 120) that requires authorization from ACD 190 and triggers reservation of bandwidth and/or QoS resources by ACD 190/SAE server 170. Service activation component 175 may be implemented in hardware, software, or a combination of hardware and software.

NIC 180 may include a distributed network component that aids in identifying a SAE server 170-1 to 170-X that is currently managing a router, such as router 130, through which a specified subscriber device 120 is connecting to network 110. NIC 180 may, for example, be implemented in software and/or hardware on different network devices in system 100. These distributed software and/or hardware components may communicate with each other and with SAE servers 170, read and write data from/to an LDAP directory, and answer requests from, for example, web service 165, regarding the identity of the one of SAE servers 170 that is currently managing router 130 through which a specified subscriber device 120 is connecting to network 110. Web service 165 may include an NIC-related component (not shown) that acts as an interface for web service 165 to NIC 180.

ACD 190 may include a distributed network component that acts to identify the network resources available along the path(s) between content 150 and subscriber device 120 for delivering requested content. ACD 190 may reserve the network resources if sufficient resources are currently available to meet the requirements for delivering the content. ACD 190 may, for example, be implemented in software and/or hardware on different network devices in system 100. These distributed software and/or hardware components may communicate with each other, with an LDAP directory, with SAE servers 170, as well as other network software and/or hardware components that have knowledge of the level of congestion in congestion points in the access network between subscriber devices 120 and router 130 and/or in network 110. Congestion points may include any type of measurable limit or restriction on network resources.

Exemplary Media Server Configuration

Figure 2:
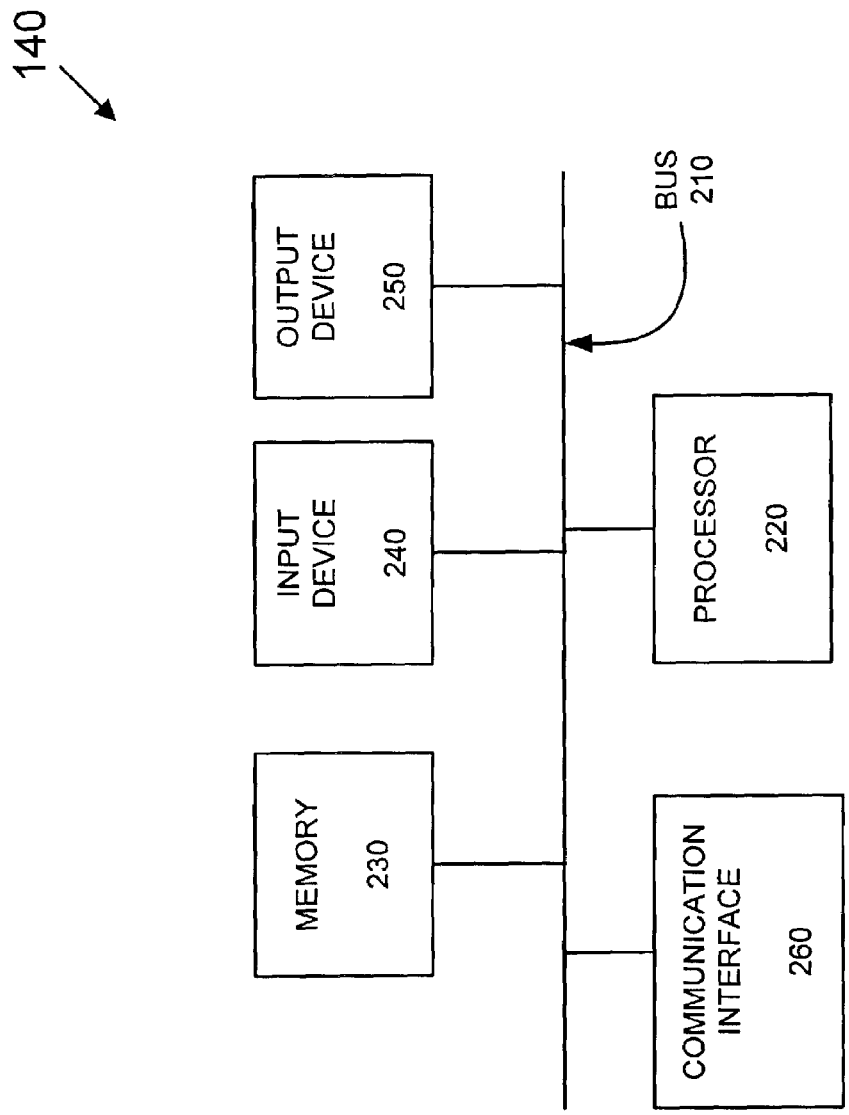
FIG. 2 is an exemplary diagram of the media server of FIG. 1 in an implementation consistent with the principles of the invention.

FIG. 2 is an exemplary diagram of media server 140 in an implementation consistent with the principles of the invention. It will be appreciated that application server 160 and SAE servers 170 may be similarly configured. As illustrated, media server 140 may include a bus 210, a processor 220, a memory 230, an input device 240, an output device 250, and a communication interface 260. It will be appreciated that media server 140 may include other components (not shown) that aid in receiving, processing, and/or transmitting data. Bus 210 permits communication among the components of media server 140.

Processor 220 may include any type of conventional processor or microprocessor that interprets and executes instructions. Memory 230 may include a random access memory (RAM) or another type of dynamic storage device that stores information and instructions for execution by processor 220; a read only memory (ROM) or another type of static storage device that stores static information and instructions for use by processor 220; and/or some other type of magnetic or optical recording medium and its corresponding drive.

Input device 240 may include one or more conventional mechanisms that permit an operator to input information to media server 140, such as a keyboard, a mouse, a pen, a biometric mechanism, and the like. Output device 250 may include one or more conventional mechanisms that output information to the operator, including a display, a printer, a speaker, etc. Communication interface 260 may include any transceiver-like mechanism that enables media server 140 to communicate with other devices and/or systems. For example, communication interface 260 may include a modem or an Ethernet interface to a network. Alternatively, communication interface 260 may include other mechanisms for communicating via a network, such as network 110.

Execution of sequences of instructions contained in a computer-readable medium may cause processor 220 to implement the functions described below. A computer-readable medium may include one or more memory devices, such as memory 230, or carrier waves. Such instructions may be read into memory 230 from another computer-readable medium or from another device via communication interface 260. In alternative embodiments, hardwired circuitry, such as an application specific integrated circuit (ASIC), may be used in place of or in combination with software instructions to implement the principles of the invention. Thus, the invention is not limited to any specific combination of hardware circuitry and software.

Exemplary Processing

Figure 3:
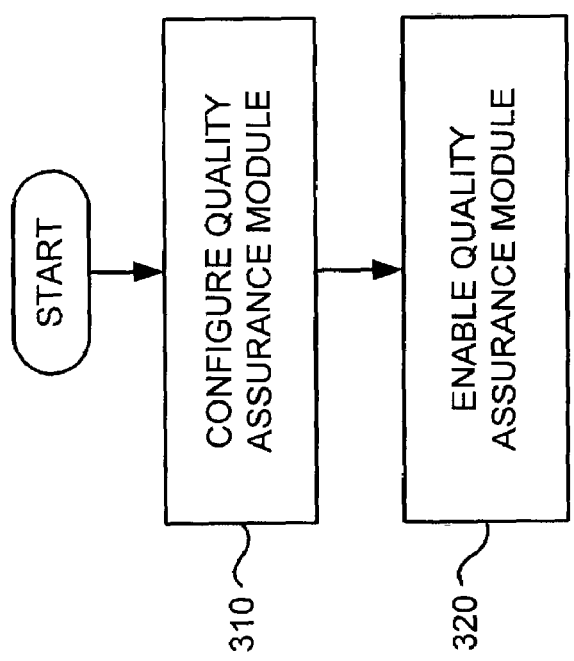
FIG. 3 illustrates an exemplary process for deploying the quality assurance module in an implementation consistent with the principles of the invention.

FIG. 3 illustrates an exemplary process for deploying quality assurance module 145 in an implementation consistent with the principles of the invention. Processing may begin by configuring quality assurance module 145 (act 310).

Configuration of quality assurance module 145 may be accomplished by modifying the configuration properties associated with quality assurance module 145. Quality assurance module 145 may be associated with the exemplary list of configuration properties, illustrated in Table 1.

TABLE 1

| Configuration Property | Default Value | Description |
| --- | --- | --- |
| Debug log enabled | False | Indicates whether or not to log debug-level messages. |
| Debug log file name | Quality Assurance Module debug.log | Identifies the file on media server 140 that contains debug-level log messages from quality assurance module 145. |
| Web Service URL | http://localhost/b2b/ScriptInvoker | Identifies the address of web service 165 via which quality assurance module 145 will activate a service before authorizing delivery of content. |
| Web Service username | Anonymous | Identifies a username assigned to the owner of media server 140. Application server 160 may enforce access controls based on this username. Billing records may be produced to include this username, allowing the owner of media server 140 to be billed. |
| Web Service password | Secret | Identifies the password, SSL certificate, or other credentials used to authenticate the identity of the owner of media server 140. |
| SAE service activation component name | QualAssur | Identifies the name of the particular service activation component 175 that should be invoked to activate or deactivate a service that will trigger the reservation of network resources for a data stream between content 150 and a specific subscriber. |
| SAE service activation component arguments | QualAssurService, <playStop>, <userIp>, <userPort>, <protocol>, <bitRate> | Defines the information to be passed to service activation component 175 identified by the "SAE service activation component name" parameter. |

Quality assurance module 145 may be associated with other configuration properties. For example, quality assurance module 145 may also be associated with configuration properties identifying QoS profiles, or associated with a configuration property indicating the interval at which failed network connections may be retried.

The "SAE service activation component name" and the "SAE service activation component arguments" configuration properties define what information will be passed from quality assurance module 145 to web service 165. In other implementations consistent with the principles of the invention, other configuration properties may define what information may be passed to web service 165.

As defined above, the "SAE service activation component name" configuration property identifies the name of the particular service activation component 175 that should be invoked to activate or deactivate a service that will reserve network resources for a data stream between media server 140 (or other device from/to which content will be delivered) and a specific subscriber. Upon receiving this information, the SAE server (e.g., SAE server 170-X) may invoke service activation component 175 specified by quality assurance module 145's "SAE service activation component name" configuration property, and pass the information specified by quality assurance module 145's "SAE service activation component arguments" configuration property to service activation component 175.

In one implementation, service activation component 175 can be designed to invoke a number of different functions, such as starting or stopping a service for a particular subscriber in order to reserve or release network resources. After installing service activation component 175, the name of service activation component 175 may be provided to the administrator of media server 140. That name may be stored as the value of quality assurance module 145's "SAE service activation component name" configuration property.

After installing a service activation component 175 on SAE server 170-X, an administrator of SAE server 170-X may specify the arguments that service activation component 175 requires to an administrator of media server 140. Those arguments may be identified by the value of quality assurance module 145's "SAE service activation component arguments" configuration property.

The "SAE service activation component arguments" configuration property may include a list of arguments in the order that is expected by service activation component 175. Quality assurance module 145 may pass these arguments to SAE server 170-X (via web service 165) exactly as they are entered by the administrator of media server 140, unless the arguments match one of the exemplary Run-time Value Names listed in Table 2. When quality assurance module 145 detects one of these run-time value names, quality assurance module 145 may replace it with a value obtained from media server 140 before passing the argument to the service activation component 175, via web service 165. The actual value that replaces the run-time value name may be different each time a subscriber requests or cancels content delivery.

TABLE 2

| Run-time Value Name | Actual Value Passed to service activation component 175 |
|---|---|
| \<playStop\> | A value indicating whether the content is being played (i.e., started or unpaused) or stopped (i.e., paused or stopped). In one implementation, the actual value may be "PLAY" or "STOP. |
| \<userIp\> | The IP address of the subscriber device 120 that is requesting a content. |
| \<usePort\> | The port number of the subscriber device 120 that is requesting a content. |
| \<bitRate\> | The bit rate (e.g., in decimal string form) required by the content. The bit rate may be expressed in bits per second. |
| \<protocol\> | The IP protocol that will be used to deliver the content to the subscriber device 120 (e.g., UDP or TCP). |

It will be appreciated that Table 2 may include other parameters that facilitate the provisioning of the access network between subscriber devices 120 and router 130 and/or network 110 for the delivery of content to a subscriber device 120 and/or the providing of the content to subscriber device 120. Once configuration is complete, quality assurance module 145 may be enabled (act 320).

In one implementation, quality assurance module 145 may be distributed as a self-installing Windows executable and deployed onto a server, such as media server 140, that is running, for example, Windows Media® Server, Series 9 or RealNetworks' Helix Server.

Quality assurance module 145 may, for example, be implemented as a NET assembly containing a class library packaged as a dynamic link library (DLL). The DLL may be copied into the Windows file system, and its presence may be registered in the Windows registry in a well-known manner. Media server 140 may monitor the registry and notice that quality assurance module 145 exists. Media server 140 may link to quality assurance module 145, and add it to the list of plug-ins shown in the media server 140's graphical user interface.

Via the graphical user interface, media server 140 may allow quality assurance module 145 to be enabled or disabled, and to have a different configuration, for each multimedia content that is available on or through media server 140 or for which media server 140 controls access. Alternatively, quality assurance module 145 can be enabled and configured just once for all content available via media server 140.

Once quality assurance module 145 has been deployed, the administrator of media server 140 may monitor its performance to ensure that quality assurance module 145 is operating properly. Monitoring of quality assurance module 145 may, for example, be performed via a graphical user interface (GUI) associated with media server 140. In one implementation, quality assurance module 145 may produce the exemplary messages illustrated in Table 3.

TABLE 3

| Message type | Destination | Examples |
|---|---|---|
| Warning-level | Media Server GUI. | Failed to open debug log file. |
| | Windows eventing facility. | Call to web service 165 was rejected. |
| | Debug log file. | Call to web service 165 failed. |
| Information-level | Windows eventing facility. | Opened debug log file. |
| | | Plug-in initialized. |
| | Debug log file. | Plug-in enabled. |
| | | Plug-in disabled. |
| | | Plug-in shutdown. |
| Debug-level | Debug log file. | Reacting to PLAY event. |
| | | Authorized PLAY following successful call to web service. |
| | | Reacting to STOP event (player has paused or stopped). |
| | | Will call web service 165 at "XX" with username "XX"; Arguments: service activation component Name = XX, service activation component Args = XX. |
| | | Service activation component 175 invocation took XXms and returned: XX. |

If any error occurs while attempting to authorize a request for content, quality assurance module 145 may deny the request. In some situations, quality assurance module 145 may adapt its behavior while an error condition exists. For example, if quality assurance module 145 cannot connect to web service 165, quality assurance module 145 may deny all requests to authorize content delivery immediately upon receiving the request, and not attempt to connect to web service 165 again until a predetermined time interval has elapsed. This adaptation in behavior improves system 100 performance by minimizing response times for the subscribers while an error condition exists.

Figure 4:
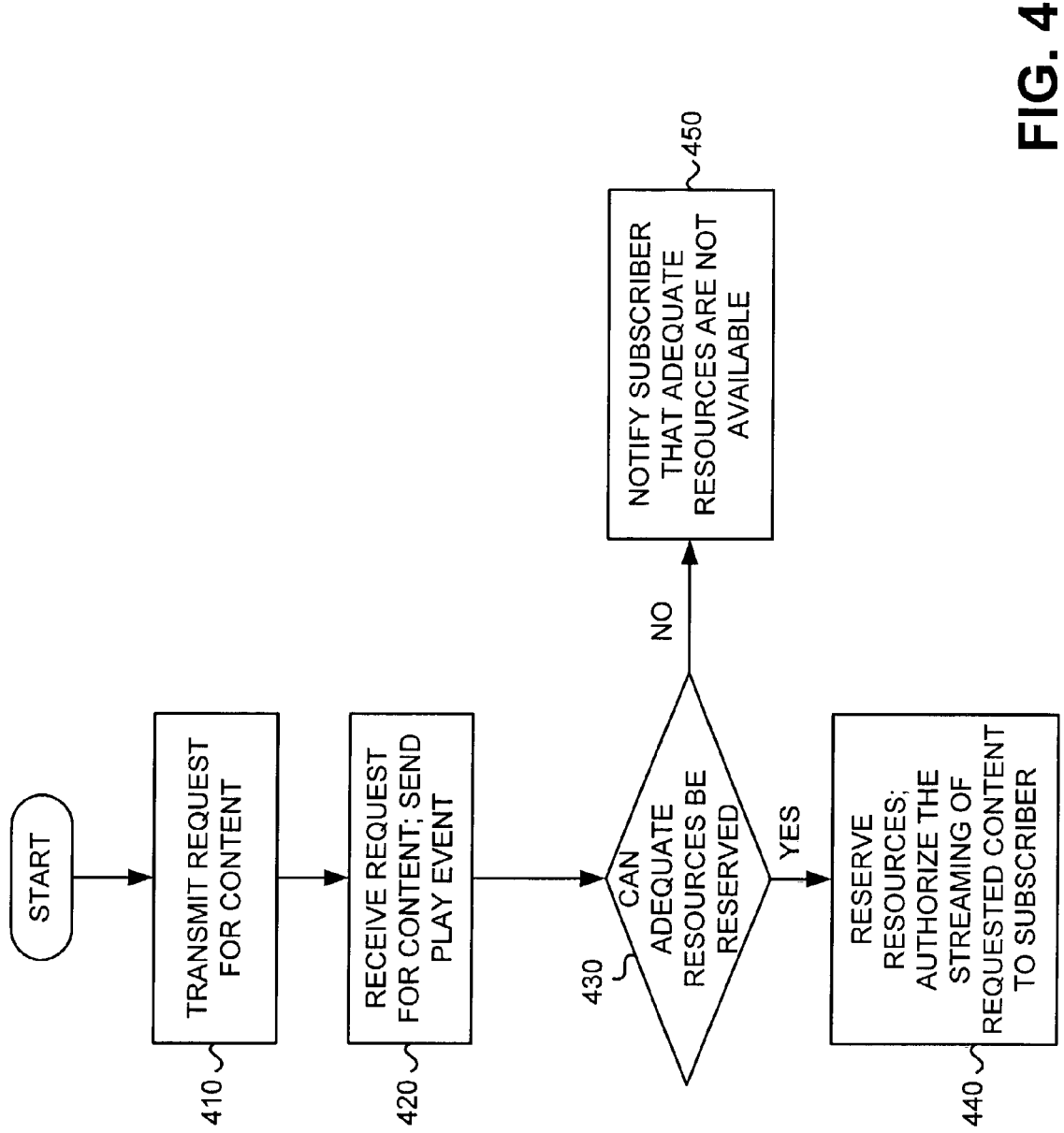
FIG. 4 illustrates an exemplary process for authorizing content to a subscriber in an implementation consistent with the principles of the invention.

FIG. 4 illustrates an exemplary process for authorizing content to a subscriber in an implementation consistent with the principles of the invention. Processing may begin with a subscriber device 120 transmitting a request for content to media server 140 for which media server 140 controls access (act 410). For example, this content may include content that is stored or dynamically generated in real time on one or multiple network devices. The content may include content that flows through media server 140 and content that does not flow through media server 140. Subscriber device 120 may transmit the request to media server 140 in a well-known manner.

Media server 140 may receive the request from the subscriber (act 420). Media server 140 may, for example, receive the request via communication interface 260. Upon identification of the request as a request for content, media server 140 may send a "PLAY" event to quality assurance module 145 (act 420). The PLAY event may describe the content requested by subscriber device 120 and identify subscriber device 120 (e.g., by IP address). In addition, the PLAY event may include additional information that provides details about the subscriber, the requested content, media server 140 with which quality assurance module 145 is associated, the commands the subscriber has sent to media server 140, etc. Alternatively, the PLAY event may make the above information available to quality assurance module 145, by providing pointers to where the information can be retrieved from, for example, memory 230 of media server 140. In another implementation consistent with the principles of the invention, the information described above with respect to the PLAY event may alternatively be obtained from the configuration of quality assurance module 145 or elsewhere (e.g., from a remote device).

Upon receipt of the PLAY event, quality assurance module 145 may determine whether to authorize or deny the PLAY event (act 430). To make this determination, quality assurance module 145 may pass any subset of the information provided in the PLAY event to web service 165. Among other things, this information may include information sufficient to identify the network resources (e.g., bandwidth and quality of service) required for delivery of the requested content. For example, the information may identify subscriber device 120 and characteristics of the content requested by subscriber device 120. The information may directly identify the network resources needed for delivery of the content. For example, the information may directly specify that the requested content requires a specific bandwidth (e.g., a bandwidth of 1.3 Mbps). The information may also (or alternatively) indirectly specify the resources that are needed. For example, the information may specify that the requested content requires a specific bandwidth and also indicate a QoS profile with which the requested content is to be handled. The QoS profile may be defined, for example, in the LDAP directory and may specify the priority with which router 130 is to handle packets associated with the requested content relative to the delivery of other packets. In one implementation, quality assurance module 145 transmits the information to web service 165 in the form of a Simple Object Access Protocol (SOAP) message. Other protocols may alternatively be used.

The subset of information from the PLAY event that actually gets passed to web service 165 may be determined by the configuration of quality assurance module 145. As set forth above, the "SAE service activation component arguments" configuration property may define the information to be passed to one of SAE severs 170 (e.g., SAE server 170-X) through web service 165. In addition, the SOAP message may include any other information that aids in providing the requested content to the subscriber. For example, the SOAP message may include information identifying service activation component 175 that should be invoked on SAE server 170-X that activates the providing of the requested content to the subscriber. This information may be obtained from quality assurance module 145's "SAE service activation component name" configuration property.

Upon receipt of the SOAP message from quality assurance module 140, web service 165 may identify, with the aid of NIC 180, the SAE server (e.g., SAE server 170-X) that manages router 130 to which the subscriber is connected. Web service 165 may then transmit the information received from quality assurance module 145 in the SOAP message to the identified SAE server 170-X. In one implementation, web service 165 transmits the information to SAE server 170-X via a Common Object Request Broker Architecture (CORBA) call. Other protocols may alternatively be used.

The receipt of the CORBA call at SAE server 170-X triggers invocation of service activation component 175, identified by quality assurance module 145's "SAE service activation component name" configuration property contained within the CORBA call. Service activation component 175 may combine the information received from web service 165 with other information (e.g., information from the memory of SAE server 170-X, information from ACD 190, service and policy definitions from the LDAP directory, information about network capabilities from router 130, etc.) to identify the relevant network resources for the content requested by subscriber device 120. As set forth above, the information from quality assurance module 145 may identify some of the network resources either directly or indirectly. Service activation component 175 may then attempt to activate a service for providing the network resources required for delivery of the content requested by the subscriber. To do so, service activation component 175 may, with the aid of ACD 190, determine whether the identified network resources exist for providing the requested content.

ACD 190 may obtain information from an LDAP directory. The information may include the maximum bandwidth available at specific congestion points in the access network between subscriber devices 120 and router 130 and/or in network 110, and how much bandwidth is going to be in-use/reserved for "background" data traffic not otherwise tracked by ACD 190. Other information may be obtained from software and/or hardware designed to monitor specific network congestion points. Different congestion points (e.g., cable modems, digital subscriber line (DSL) modems, DSLAMs, etc.) may require different types of monitoring software/hardware. Each type of monitoring software/hardware may inform ACD 190 how much bandwidth is currently available at the congestion points monitored by that software/hardware. Moreover, each SAE server 170 may inform ACD 190 which services are active for each subscriber, and how much bandwidth is required for each service. ACD 190 may combine the information from these three sources to determine, given a service activation attempt for a service that requires a specific bandwidth, whether that bandwidth is currently available.

If ACD 190 determines that adequate network resources (e.g., bandwidth and/or QoS resources) are unavailable to provide the requested content, ACD 190 may deny the request. For example, if the subscriber is connected via a 750 Kbps DSL line, and has a service active that consumes 500 Kbps, and delivery of the content requires allocation of another 1 Mbps, ACD 190 may deny the service activation. On the other hand, if adequate network resources are available to provide the requested content, ACD 190 may authorize the request and reserve the necessary resources (act 440).

SAE server 170-X may transmit the result of the activation attempt (e.g., success or failure) to quality assurance module 145 via web service 165. In one implementation, SAE server 170-X may transmit the activation attempt results in a CORBA call to web service 165, which may, in turn, transmit the results to quality assurance module 145 via a SOAP message.

If the activation attempt failed (indicating that adequate resources are unavailable to handle the requested content), quality assurance module 145 may notify the subscriber of such (act 450). If, on the other hand, the activation attempt succeeded (indicating that adequate resources are available to handle the requested content and have been reserved), quality assurance module 145 may authorize the delivery of the requested content to the subscriber (act 440). Media server 140 may then begin delivery the requested content to subscriber device 120. In this way, media server 140 can guarantee that subscribers will receive delivery of requested content at a specific bandwidth and with a specific QoS profile, thereby ensuring a high-quality subscriber experience.

Later, when the subscriber stops or pauses the delivery of the content, media server 140 may pass a "STOP" event to quality assurance module 145. Quality assurance module 145 may deactivate the service that provides the network resources required for delivery of the content requested by the subscriber, which releases the network resources, in a manner similar to the service activation process described above.

CONCLUSION

Systems and methods consistent with the principles of the invention improve the delivery of content over a network. In an exemplary implementation, a quality assurance module may ensure that adequate network resources are available for requested content prior to providing the content to subscribers. In this way, the content provider can guarantee that the subscribers receive delivery of the content at a specific bandwidth and with a specific QoS profile.

The foregoing description of exemplary implementations consistent with the principles of the invention provides illustration and description, but is not intended to be exhaustive or to limit the invention to the precise form disclosed. Modifications and variations are possible in light of the above teachings or may be acquired from practice of the invention. For example, while the above-described implementations focused on content flowing to a subscriber device 120, implementations consistent with the principles of the invention are not so limited. One skilled in the art will appreciate that implementations consistent with the principles of the invention are equally applicable to content flowing from a subscriber device 120, instead of (or in addition to) content that is flowing to subscriber device 120. For example, in a multi-player on-line game, a subscriber device 120 may transmit data to and receive data from multiple other subscriber devices 120. In other games or virtual environments, subscriber devices 120 may send data to and/or receive data from a common server. Quality assurance module 145 may be used to ensure that the necessary network resources exist for such content flows.

Moreover, while the above description focused on a "unicast" environment (e.g., where a subscriber device 120 requests content and media server 140, in response to the request, delivers (or triggers the delivery of) the content), implementations consistent with the principles of the invention are equally applicable to a "multicast" environment, where media server 140 delivers (or triggers the delivery of) the content to whomever is interested. Media server 140 does not know which subscriber devices 120 are actually receiving the content, but rather broadcasts the content indiscriminately. In this situation, subscriber device 120 may request to receive the content via web service 165 directly, or via, for example, software running on an intermediate server or router 130. The software on the intermediate server or router 130 may transmit information similar to the information transmitted by quality assurance module 145 to either web server 165 or directly to SAE server 170-X and the process for delivering the content to the subscriber at a subscriber device 120 may proceed in a manner similar to that described above with respect to FIG. 4.

While specific devices and their corresponding functions were described above with respect to FIGS. 1-4, in other implementations consistent with the principles of the invention, some devices in FIG. 1 may perform the functions of other devices in FIG. 1. For example, quality assurance module 145 may perform the functions of web service 165, or vice versa. Therefore, implementations consistent with the principles of the invention are not limited to any particular configuration.

While series of acts have been described with regard to FIGS. 3 and 4, the order of the acts may be varied in other implementations consistent with the present invention. Moreover, non-dependent acts may be implemented in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A server comprising:
a memory configured to store instructions; and
a processor to execute the instructions to:
receive a first request for content from a subscriber device,
generate a second request in response to receiving the first request, the second request identifying the subscriber device,
transmit the second request to a remote device, the second request causing the remote device to determine whether adequate resources exist for providing the content to the subscriber device and reserve the adequate resources when adequate resources are determined to exist,
receive, from the remote device, information indicating that the adequate resources have been reserved, and
provide the content to the subscriber device when the adequate resources have been reserved,
where the server is associated with a plurality of configuration properties, the plurality of configuration properties including information identifying a service activation component to be executed on the remote device and a list of information to be passed to the service activation component, the list of information including one or more of a value indicating whether the content is being played or stopped, an address associated with the subscriber device, a port number associated with the subscriber device, a bit rate for the content, a quality of service profile for the content, or a protocol to be used to transmit the content to the subscriber device.

2. The server of claim 1 wherein the server includes a content server.

3. The server of claim 1 wherein the resources include a bandwidth and quality of service profile for the content.

4. The server of claim 1 wherein the second request further identifies one or more characteristics of the content.

5. The server of claim 1 wherein, when transmitting the second request to the remote device, the processor is configured to:
   transmit the second request to the remote device via an intermediate remote device.

6. The server of claim 5 wherein the plurality of configuration properties further includes an address identifying the intermediate remote device.

7. The server of claim 1 wherein the processor is further configured to:
   deny the first request when adequate resources are determined not to exist.

8. The server of claim 1 wherein the remote device is associated with a router to which the subscriber device is connected.

9. The server of claim 1 wherein the processor is further configured to implement a quality assurance module, the quality assurance module generating the second request and transmitting the second request to the remote device, the quality assurance module being configured to be enabled or disabled on a per content basis.

10. The server of claim 1 wherein the processor is further configured to implement a quality assurance module, the quality assurance module generating the second request and transmitting the second request to the remote device, the quality assurance module being configurable on a per content basis.

11. A method for providing content in a network, comprising:
   receiving a first request for content from a subscriber device;
   generating a second request in response to receiving the first request, the second request identifying the subscriber device and including information relating to the content, the information relating to the content including one or more of:
      a value indicating whether the content is being slaved or stopped,
      an address associated with the subscriber device,
      a port number associated with the subscriber device,
      a bit rate for the content,
      a quality of service profile for the content, or
      a protocol to be used to transmit the content to the subscriber device;
   transmitting the second request to a remote device, the second request causing the remote device to determine whether adequate network resources are available for providing the content to the subscriber device and reserving the network resources when adequate network resources are available;
   receiving information from the remote device indicating whether the network resources have been reserved; and
   providing the content to the subscriber device when the network resources have been reserved.

12. The method of claim 11 wherein the second request further includes information identifying a service activation component to be invoked on the remote device.

13. The method of claim 11 further comprising denying the first request when the information from the remote device indicates that adequate network resources are unavailable for providing the content to the subscriber device.

14. The method of claim 11 wherein the information relating to the content includes one or more of:
   a value representing a bandwidth at which the content is to be provided, or
   a quality of service profile for the content.

15. A system comprising:
   a memory to store instructions; and
   a processor to execute the instructions to:
      receive a first request for content from a subscriber device,
      create a second request in response to receiving the first request, the second request identifying the subscriber device and including information relating to the content, the information relating to the content including one or more of:
         a value indicating whether the content is being slaved or stopped,
         an address associated with the subscriber device,
         a port number associated with the subscriber device,
         a bit rate for the content,
         a quality of service profile for the content, or
         a protocol to be used to transmit the content to the subscriber device,
      transmit the second request to a remote device, the second request causing the remote device to determine whether adequate network resources are available for providing the content to the subscriber device and reserve the network resources when adequate network resources are determined to be available,
      receive information from the remote device indicating whether the network resources have been reserved, and
      provide the content to the subscriber device when the network resources have been reserved.

16. The system of claim 15 where the second request further includes:
   information identifying a service activation component to be invoked on the remote device.

17. The system of claim 15 where the processor is further configured to:
   deny the first request when the information from the remote device indicates that adequate network resources are unavailable for providing the content to the subscriber device.

18. The system of claim 15 where the information relating to the content includes one or more of:
   a value representing a bandwidth at which the content is to be provided, or
   a quality of service profile for the content.

* * * * *

UNITED STATES PATENT AND TRADEMARK OFFICE
CERTIFICATE OF CORRECTION

PATENT NO. : 7,437,458 B1  
APPLICATION NO. : 10/460158  
DATED : October 14, 2008  
INVENTOR(S) : Hugh Donal Stewart et al.

Page 1 of 1

It is certified that error appears in the above-identified patent and that said Letters Patent is hereby corrected as shown below:

Col. 13 claim 11, line 44, "slaved" should read "played"

Col. 14 claim 15, line 25, "slaved" should read "played"

Signed and Sealed this

Twenty-fifth Day of November, 2008

JON W. DUDAS  
*Director of the United States Patent and Trademark Office*